Feb. 4, 1930.                I. LANGMUIR ET AL                1,746,196
            METHOD AND APPARATUS FOR ELECTRIC ARC WELDING
                            Filed Sept. 5, 1925
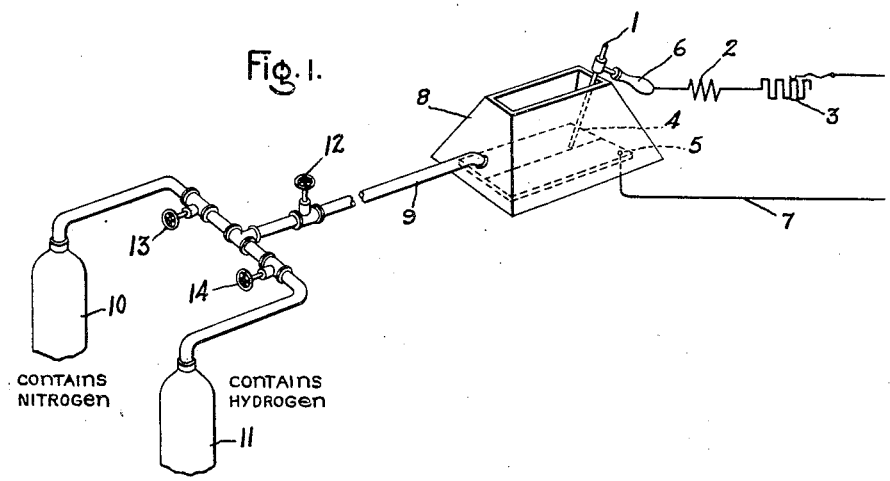
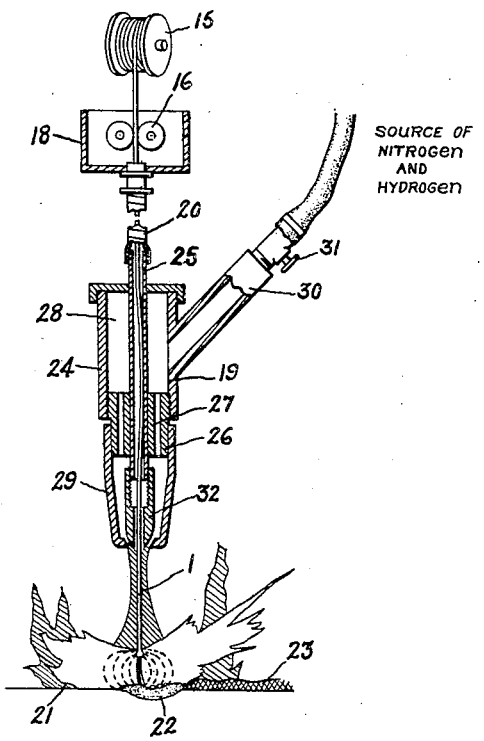
Inventors:
Irving Langmuir.
Peter P. Alexander;
by
Their Attorney.

Patented Feb. 4, 1930

1,746,196

UNITED STATES PATENT OFFICE

IRVING LANGMUIR, OF SCHENECTADY, NEW YORK, AND PETER P. ALEXANDER, OF MARBLEHEAD, MASSACHUSETTS, ASSIGNORS TO GENERAL ELECTRIC COMPANY, A CORPORATION OF NEW YORK

METHOD AND APPARATUS FOR ELECTRIC-ARC WELDING

Application filed September 5, 1925. Serial No. 54,637.

Our invention relates to electric arc welding and cutting of the type wherein the arc is mantained in a gaseous medium, and more particularly to improvements which shall enable reliable, strong, sound and ductile welds to be produced with certainty.

Welds made in the open air by the electric arc process are characterized by brittleness or lack of ductility. The weld metal is subjected to an extremely high temperature for an interval of time which is sufficient to cause the formation of compounds with atmospheric gases, which compounds impart the brittle quality to the weld. Metal which is oxidized is porous and brittle. It has been proposed to surround the arc and blanket the molten portions of the work with a stream of an inert gaseous element such as pure dry nitrogen for the purpose of excluding the major portion of the atmospheric oxygen, but welds so made are found to be no more ductile than welds made in ordinary atmospheric air which contains about 80% of nitrogen. Welds made in a container or housing into which is passed a great excess of dry nitrogen of highest commercial purity are found in eight cases out of ten to be as brittle or more brittle than welds made in air. It is now generally recognized that one of the principal causes of brittleness is the presence of nitrides in the weld metal.

Perfectly ductile welds may, however, be made in an atmosphere of hydrogen. An example of such welding is disclosed and claimed in the application of Peter P. Alexander, Serial No. 758,082, filed December 26, 1924, for methods and apparatus for electric arc welding, assigned to the same assignee as the present application.

The welding arc maintained in an atmosphere of hydrogen is characterized by an arc voltage which is about twice the arc voltage of an arc in air. The critical voltage of such an arc is 38 volts, and the usual operating voltage is from 40 to 50 volts, although the upper limit is not fixed. Wide variations in arc length may occur with such an arc without damaging the deposited metal. Such welding is also characterized by the fact that a much higher striking voltage is necessary than is necessary in air to strike and maintain the arc. It has been found that a minimum striking voltage of about 120 volts is necessary in a hydrogen atmosphere. This striking voltage may be obtained by providing a source having a sufficiently high open circuit voltage or by using a source whose open circuit voltage may be considerably lower than 120 volts, provided a sufficiently great amount of reactance is used in the welding circuit. The higher arc voltage is advantageous where a large amount of energy is desired in the arc, as for example where work of considerable thickness is to be welded. The greater energy available also results in higher speeds of welding and makes such an arc of value in electric arc cutting. For many classes of work, however, an arc voltage substantially the same as that in air is sufficient, and in accordance with one aspect of our invention welding equipments adapted to produce the voltages required for arc welding in air can be used for producing ductile welds in our gaseous medium. For overhead welding the lower arc voltage is preferable.

In the hydrogen process nitrogen and oxygen are substantially excluded from around the arc and molten portions of the work. We have discovered, however, that it is unnecessary to exclude nitrogen from the gaseous medium where hydrogen is present. On the contrary, as hereinafter pointed out, there are many advantages in having nitrogen present. According to our discovery, nitrogen apparently does not combine directly with the iron of the weld metal, but will combine indirectly in the presence of a very small amount of oxygen. Oxygen occluded in the electrode or work, or diffused into the atmosphere around the arc, or brought in from atmospheric air by eddy currents into the medium, combines with the weld metal and the oxygen of the compound formed appears to be replaced by nitrogen to form a new compound at the high temperature of the process. In this way a very small amount of oxygen in the presence of nitrogen is sufficient to produce a brittle weld. We have discovered that this tendency to the formation of brittle welds in the presence of nitrogen may be avoided by supplying a sufficient excess of hydrogen over the oxygen present in the gas around the point of welding. Under the conditions of arc welding the presence of this hydrogen prevents the weld metal from taking up oxygen and thus the harmful effects of the nitrogen are avoided.

By welding in a container with mixtures of hydrogen and nitrogen of high commercial purity, about 6% by volume of hydrogen seems to counteract completely the effects of the traces of oxygen present in the gases or in the metal of the weld so that welds of great ductility are obtained. When welding is done in the open air eddy currents draw air into the flame and into contact with the molten metal, and, unless there is a sufficient excess of hydrogen present, the welds will be less ductile. To insure welds of the greatest ductility where the weld is to be made in open air, the percentage of hydrogen present should preferably be considerably more than 6%, the excess depending upon the design of the torch used. Welds of excellent quality have been made with a mixture comprising about 20% hydrogen.

The process of the present invention is of particular utility in the welding of certain alloys which tend to absorb hydrogen and become porous. Such alloys can be welded more advantageously in a hydrogen-nitrogen mixture than in hydrogen, since the welds are less porous. Welds with nickel-chromium alloys have been successfully made, and we have found it to be a good mixture for depositing stellite on a backing piece to provide a hard wearing or cutting surface for a die or tool.

Our process is likewise suitable for electric arc cutting. The voltage of an arc in hydrogen is greatly in excess of that of the corresponding arc in air, and this high normal voltage makes it possible to secure a much greater heating effect with this arc in a hydrogen atmosphere than in air for the same current, and with this high arc voltage and a high current value the energy available by the employment of such an arc is tremendous. When a hydrogen-nitrogen mixture is used, the resulting voltage is slightly lower than in pure hydrogen, yet the energy may be maintained at any desired value by increasing the arc length. Arc voltages from 70 to 100 volts may be used advantageously for such cutting. Such arc voltages of course require a source whose open circuit voltage is still higher.

The gaseous medium of hydrogen and nitrogen used in our process may be produced by mixing the separate gases before they reach the arc or by decomposing a suitable medium such as ammonia. Such use of ammonia for welding is claimed in the application of Peter P. Alexander, Serial No. 61,120, filed October 7, 1925, for methods and apparatus for electric arc welding, assigned to the same assignee as the present application. As disclosed and claimed in said Alexander application such mixtures may also be secured by passing a stream of air with a sufficient amount of hydrogen, about one-third of the amount of air, through a special combustion chamber. Such mixing burners are extensively used in many synethetic ammonia plants. All the oxygen in the air will be combined with the hydrogen in such apparatus and the resulting gas, a mixture of nitrogen, water vapor and an excess of hydrogen, may be conducted to a condensing chamber where the water vapor will be condensed and the remaining hydrogen and nitrogen gases delivered directly to the welding torch. It is preferable to eliminate the water vapor.

One of the characteristic features of welding with a hydrogen-nitrogen mixture is the ease with which the heat and rate of metal deposition may be controlled. The arc voltage and speed of welding varies in proportion to the percentage of hydrogen present. With 75% of hydrogen the arc is more stable than in pure hydrogen, yet the voltage drop is about the same as in pure hydrogen. The arc may be struck and maintained from a source whose open circuit voltage is about 75 volts. A source suitable for welding in air may therefore be used. This mixture will give a high speed of welding or of cutting. By reducing the hydrogen to 20 to 25% of the total gas mixture, conditions approaching those of welding in air may be secured with respect to arc voltage. In this mixture the arc is very quiet and the amount of voltage dissipated in the arc is about the same as in air.

By increasing the nitrogen content in the mixture the flame can be rendered almost invisible, and in fact with a sufficiently high nitrogen content the mixture becomes incombustible. Such mixtures can be used to great advantage for overhead work, for the flame does not then interefere with the workman's vision. The resulting lower voltage with such mixtures also gives an arc length and rate of deposition that are better for overhead work.

Our invention as in the case of arc welding in a hydrogen atmosphere may be used for manual, semi-automatic, or full automatic arc welding. In manual arc welding, the operator by the aid of a suitable electrode holder strikes and maintains the arc manually. In semi-automatic arc welding, means are provided for automatically feeding the electrode to compensate for its consumption, and in full automatic arc welding the electrode is not only automatically fed to compensate for its consumption, but automatic means are provided for producing relative movement between the arc and the work along the line of the joint to be welded. While our invention is particularly applicable to welding of the type where metal is deposited from a fusible electrode, such as an iron or steel electrode, it is also applicable where a carbon or tungsten electrode is used. Where the arc is between the electrode and the work we prefer to use direct current and make the work positive. Our invention is also applicable in its broader aspects to arc welding systems in which the arc is maintained between a plurality of electrodes, instead of between the electrode and the work to be welded and non-consuming electrodes may be used if desired.

Our invention will be better understood from the following description when considered in connection with the accompanying drawing, and its scope will be pointed out in the appended claims.

In the drawing, Fig. 1 diagrammatically represents our invention as applied to manual arc welding, and Fig. 2 represents our invention as applied to semi-automatic or automatic arc welding.

In Fig. 1 the electrode 1, which may be either a metallic or carbon electrode, is indicated as connected to a supply circuit through a reactor 2 and a resistor 3. The work is shown as a pair of plates 4 and 5. The electrode is indicated as held by a suitable holder 6 adapted to be manipulated to cause the arc to be established or maintained between the electrode and the work during the welding operation. The lead 7 is shown for connecting the work to the other side of the supply circuit. In order to simplify the drawing, the source is not shown, but it may be a constant potential source where a series stabilizing resistor, such as 3, is used. The source may be, however, an inherently regulated generator which may supply the arc without the use of a stabilizing resistor. A hood 8 of suitable material, such as asbestos, is shown as covering the work. It may be comparatively small and cover but a portion of the work. The hood has an open top which is only sufficiently large to permit the operator to manipulate the electrode readily. The hood may be of iron and provided with an asbestos cover having an opening therein. During welding the gas burns for a short distance above the opening in the hood. The gaseous medium is conducted to the hood through a cnduit 9 from containers 10 and 11. Valve 12 is provided for controlling the supply of gas to the receptacle 8. Valves 13 and 14 are provided for adjusting the mixture to produce the proper atmosphere within the receptacle. It will be apparent that our invention is not limited to the apparatus described and that the hydrogen-nitrogen mixture may be supplied by any convenient means or in any convenient manner.

Fig. 2 shows the application of our invention to a semi-automatic apparatus, wherein the arc is between a fusible metallic electrode and the work. In this type of apparatus the operator manually holds or guides the welding device or tool over the work to be welded and automatic means feeds the metallic electrode or wire from the tool toward the work to maintain the arc. In such apparatus the rate at which the electrode is fed may be automatically regulated to maintain the arc length substantially constant. An example of such means is shown in Letters Patent to Noble No. 1,508,711, dated September 16, 1924. To convert such an apparatus, or the apparatus of Fig. 2, into a full automatic machine, it is merely necessary to provide suitable means for automatically producing relative movement between the electrode and the work along the line of the joint to be welded. The electrode will thus not only be fed automatically to maintain the arc, but the movement along the joint to be welded will also be effected automatically.

In Fig. 2 a metallic electrode or pencil 1 is indicated as being drawn from the reel 15 by means of feed rollers 16 driven by suitable means. The feed rollers are indicated as mounted in a suitable welding head 18. The electrode is shown as being fed to an electrode and gas delivery device or welding tool 19 and is represented as guided from the welding head to the tool by a flexible electrode guide tube 20.

We have not illustrated the details of the electrode feeding mechanism and the flexible guide tube arrangement shown in Fig. 2 since these parts are well known in the art of arc welding in air. Such apparatus is shown for example in Letters Patent to Noble No. 1,508,711 heretofore referred to. The Letters Patent to Noble also show arrangements for automatically controlling the rate of electrode feed in accordance with an electrical characteristic of the arc which varies with the arc length.

The work to be welded is diagrammatically indicated at 21 and the welding arc is struck and maintained between the work 21 and the electrode 1. The work is connected to one side of a suitable supply circuit as heretofore stated. The molten portion of the work is indicated at 22, and the solidified metal which has been deposited along the line of the joint to be welded is indicated at 23.

The welding tool 19 comprises a body member 24 through the top of which projects the tube 25 which is connected to the electrode guide tube 20. The body member 24 is provided with a plug 26 shown threaded into the lower end thereof. The plug 26 is provided with a series of openings 27 leading from the chamber 28 in the body member 24 to the interior of the nozzle piece 29 which is secured in any desired manner with a tight joint to the plug 26. The tube 30 is connected to a source of hydrogen and nitrogen under pressure. A flexible hose connection permits the tool to be held in any desired position. A valve 31 is indicated in the gas supply connection for controlling the amount of the mixture supplied to the tool. The mixture enters chamber 28 and passes through the openings 27 into the interior of the nozzle 29 and is delivered in a stream surrounding the electrode. As shown, the tube 25 is provided with a member 32 which cooperates with the cap 29 to determine the size of the orifice through which the mixture issues. By adjusting the member 32 on the tube 25 the size of the orifice may be adjusted.

The application of Irving Langmuir, Serial No. 729,185, filed July 30, 1924, for heating process and apparatus, assigned to the same assignee as the present application, discloses and claims method and apparatus for producing atomic hydrogen and carrying it over to the work where it is recombined, liberating heat. Whether or not heating of the work by the recombination of dissociated hydrogen may under certain circumstances be present to some extent when our invention is used, we make no claim to such subject matter since the Langmuir invention is earlier than our invention.

Our invention is not limited to any particular construction of tool nor size and shape of orifice. The gas delivery hose and the flexible tube for the electrode may be combined into one element if it is so desired, or a hood similar to the hood shown in Fig. 1 may be placed about the tool and gas conducted to this in any desired manner. It is also to be understood that other gases may be added as harmless diluents or to secure added results without departing from our invention. We therefore aim in the appended claims to cover all such modifications and variations as fall within the true spirit and scope of our invention.

What we claim as new and desire to secure by Letters Patent of the United States is:—

1. The method of fusing metal by the electric arc process, which comprises maintaining the arc in a gaseous mixture containing hydrogen with substantial amounts of nitrogen.

2. The method of fusing metals by the electric arc process which comprises maintaining the arc in a gaseous medium containing nitrogen and an amount of hydrogen which is so related to the traces of oxygen present that the harmful effects of nitrogen in the presence of oxygen are neutralized.

3. The method of producing ductile welds by the metallic arc process which comprises maintaining the arc between the work and a fusible metal electrode and surrounding the arc and molten portions of the work with hydrogen diluted with nitrogen.

4. The method of producing ductile welds by the electric arc process in the open air which comprises flowing around the arc and upon the molten portions of the work a gaseous mixture of nitrogen and hydrogen, the hydrogen comprising at least approximately six per cent of the mixture by volume whereby the tendency of nitrogen to cause brittle welds in the presence of small amounts of oxygen is effectively neutralized.

5. The method of producing ductile welds by the electric arc process in the open air which comprises maintaining an arc between the work and a fusible metallic electrode while supplying a gaseous medium composed principally of nitrogen to surround the arc and exclude atmospheric air from the work while supplying simultaneously a sufficient volume of hydrogen to prevent the formation of nitrogen compounds in the weld metal.

6. The method of producing ductile welds by the electric arc process, which comprises maintaining the arc and the molten portions of the work in an atmosphere comprising a reducing gas diluted with a neutral gaseous element, said reducing gas having a greater affinity than iron for oxygen and present in sufficient quantity to neutralize the tendency of nitrogen in the presence of small amounts of oxygen to combine with the weld metal.

7. The method of producing ductile welds by the electric arc process in an atmosphere containing a substantial proportion of nitrogen, which comprises supplying a gaseous medium containing hydrogen diluted with a neutral gaseous element acting to reduce the arc voltage and steady the arc, said medium being supplied so as to surround the arc and molten portion of the work and substantially exclude atmospheric oxygen, the hydrogen content of said medium being sufficient to combine with any oxygen which may be present.

8. The method of electric arc welding which comprises maintaining the arc in a gaseous mixture of hydrogen and an inert gas, the hydrogen being present in sufficient quantity to prevent the formation of nitrides in the weld but not substantially in excess of the proportion at which the mixture becomes combustible in air.

9. Apparatus for electric arc welding of the type wherein the welding arc is maintained between the work to be welded and a metallic electrode comprising an electrode delivery device, means for feeding the electrode continuously through said delivery device to maintain the arc, a source of hydrogen and nitrogen, means for controlling the mixture of said hydrogen and nitrogen, and means for supplying said mixture to the delivery device, said device being provided with means for discharging the mixture so as to envelop the arc and molten portions of the work.

10. The method of electric arc welding which comprises maintaining an arc and surrounding the arc and molten portions of the work with a gaseous mixture comprising a gaseous element that will not liberate oxygen in the presence of the arc, and a reducing gaseous element having in the presence of the arc a greater affinity than iron for oxygen, whereby the tendency of atmospheric gases to produce compounds rendering the weld metal brittle is neutralized.

In witness whereof IRVING LANGMUIR has hereunto set his hand this 2nd day of September 1925, and PETER P. ALEXANDER has hereunto set his hand this 3rd day of September, 1925.

IRVING LANGMUIR.
PETER P. ALEXANDER.